United States Patent [19]

Okada

[11] Patent Number: 4,657,247

[45] Date of Patent: Apr. 14, 1987

[54] VIDEO GAME APPARATUS WITH AUTOMATICALLY ADJUSTING TIMING WINDOW

[75] Inventor: Kazuo Okada, Tokyo, Japan

[73] Assignee: Kabushiki Kaisha Universal, Tochigi, Japan

[21] Appl. No.: 808,278

[22] Filed: Dec. 12, 1985

[30] Foreign Application Priority Data

Dec. 12, 1984 [JP] Japan .................................. 59-188540

[51] Int. Cl.$^4$ ............................................... A63F 9/22
[52] U.S. Cl. ............................ 273/1 E; 273/DIG. 28; 273/1 GC
[58] Field of Search .............. 273/1 E, 1 GC, 1 GE, 273/85 G, 88, 93 R, DIG. 28

[56] References Cited

U.S. PATENT DOCUMENTS 4,366,960  1/1983  Bromley et al. .................. 273/85 G
4,395,760  7/1983  Soski et al. ............................. 273/88

*Primary Examiner*—Richard C. Pinkham
*Assistant Examiner*—MaryAnn Stoll Lastova
*Attorney, Agent, or Firm*—Young & Thompson

[57] ABSTRACT

A video game apparatus which judges a game success if the operation timing of an operation member manipulated by a player in accordance with a displayed game image falls within an allowable time limit for game success set in a range setting unit. The apparatus includes a first output unit for outputting a signal corresponding to the success or failure of the operation timing by using the allowable time limit for game success as a reference, a count unit for counting the signal from the first output unit, a second output unit for outputting an adjustment signal when the count of the count unit reaches a predetermined value; and an allowable range changing unit for changing the allowable time limit for game success set in the range setting unit when the adjustment signal is inputted thereto. The degree of difficulty in playing the game is automatically changed in accordance with the player's skill.

4 Claims, 8 Drawing Figures

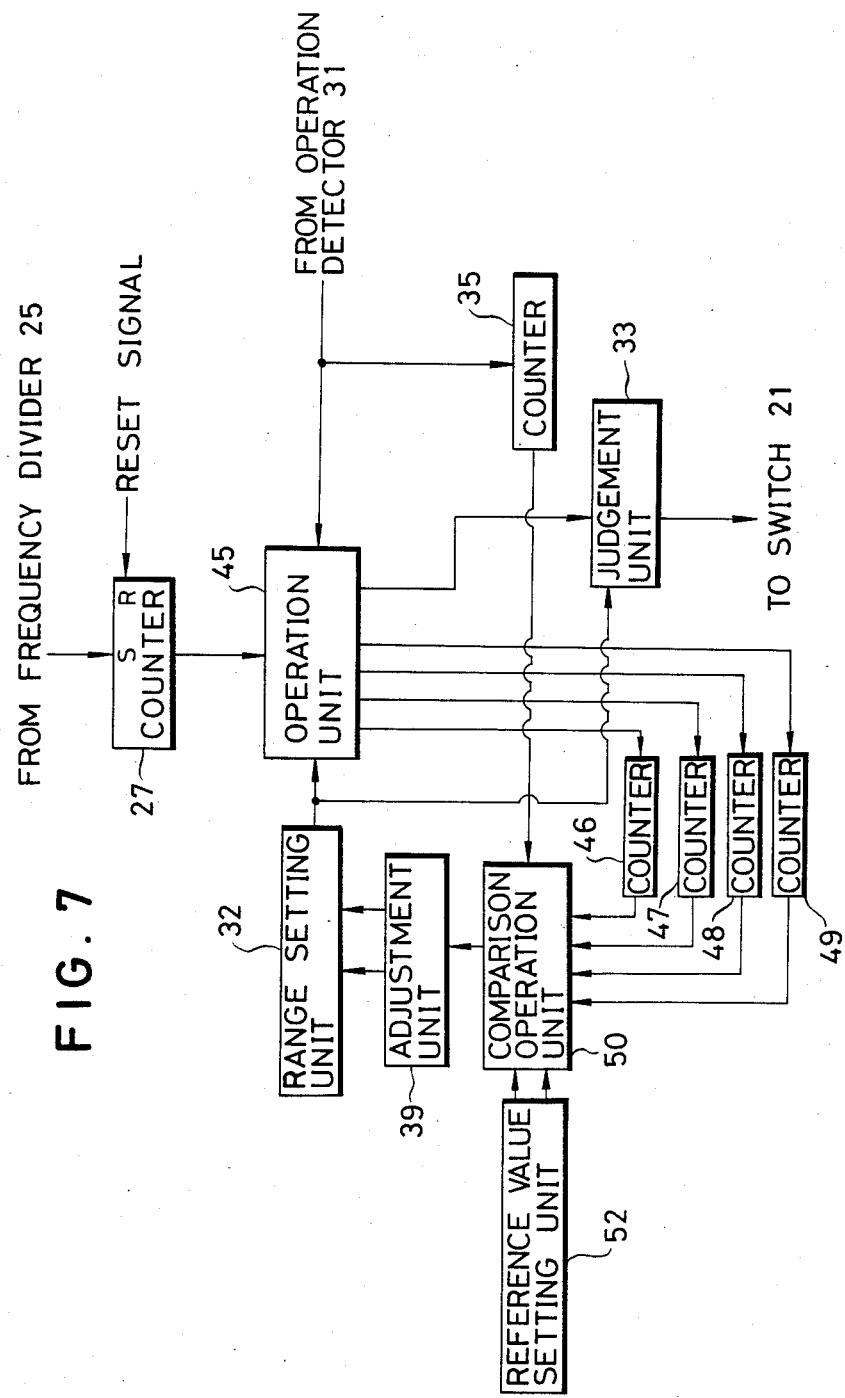

VIDEO GAME APPARATUS WITH AUTOMATICALLY ADJUSTING TIMING WINDOW

BACKGROUND OF THE INVENTION

The present invention relates to a video game apparatus and more particularly, to a video game apparatus in which the degree of difficulty in playing a game is automatically adjusted in accordance with the player's skill.

Generally, a video game proceeds as the player manipulates an operation unit such as a button and a lever, while looking at the game images displayed on a CRT. The progress and development of the video game and corresponding displayed game images change depending on whether the operation timing and direction of the operation unit have been effected within the allowable time limit for a game success. For example, a game success image or a failure image is displayed depending on whether the operation timing is performed within the allowable time limit for game success (win).

The game images of a video game are produced from graphic data stored in a laser disc, magnetic disc, ROM cartridge, or the like. These storage devices however have a limited capacity. Therefore, as the number of game plays increases, the player becomes accustomed to the game and more easily controls the operation timings of the operation unit within the allowable time limit for game success, so that the player becomes tired of the game. If the range of the allowable time limit is set narrower to avoid such a case, then the beginners are unduly challenged by the game and cannot enjoy it.

Although there is such a video game apparatus capable of setting the degree of difficulty in playing the game, the basis for setting the degree of difficulty is somewhat obscure, the setting is cumbersome, and such an apparatus is therefore not commonly used heretofore.

SUMMARY OF THE INVENTION

It is an object of the present invention to eliminate the above-noted prior art problems.

It is another object of the present invention to provide a video game apparatus capable of automatically adjusting the degree of game difficulty by judging the player's skill while the game progresses.

The above and other objects of the present invention are achieved by the provision of a video game apparatus wherein the allowable time limit for a game success is compared with the operation timings of the operation unit manipulated by the player, and is automatically varied with the player's skill by judging based on the game score the player has gained.

The basis for evaluating the game score depends on the operation timings relative to the allowable time limit for a game success. According to the preferred embodiment of the present invention, such an evaluation is performed repeatedly after a certain number of games are played.

BRIEF DESCRIPTION OF THE DRAWINGS

FIG. 7 is a block diagram showing the main part of the circuit according to a second embodiment of the invention.

DETAILED DESCRIPTION OF THE PREFERRED EMBODIMENT

Figure 2:
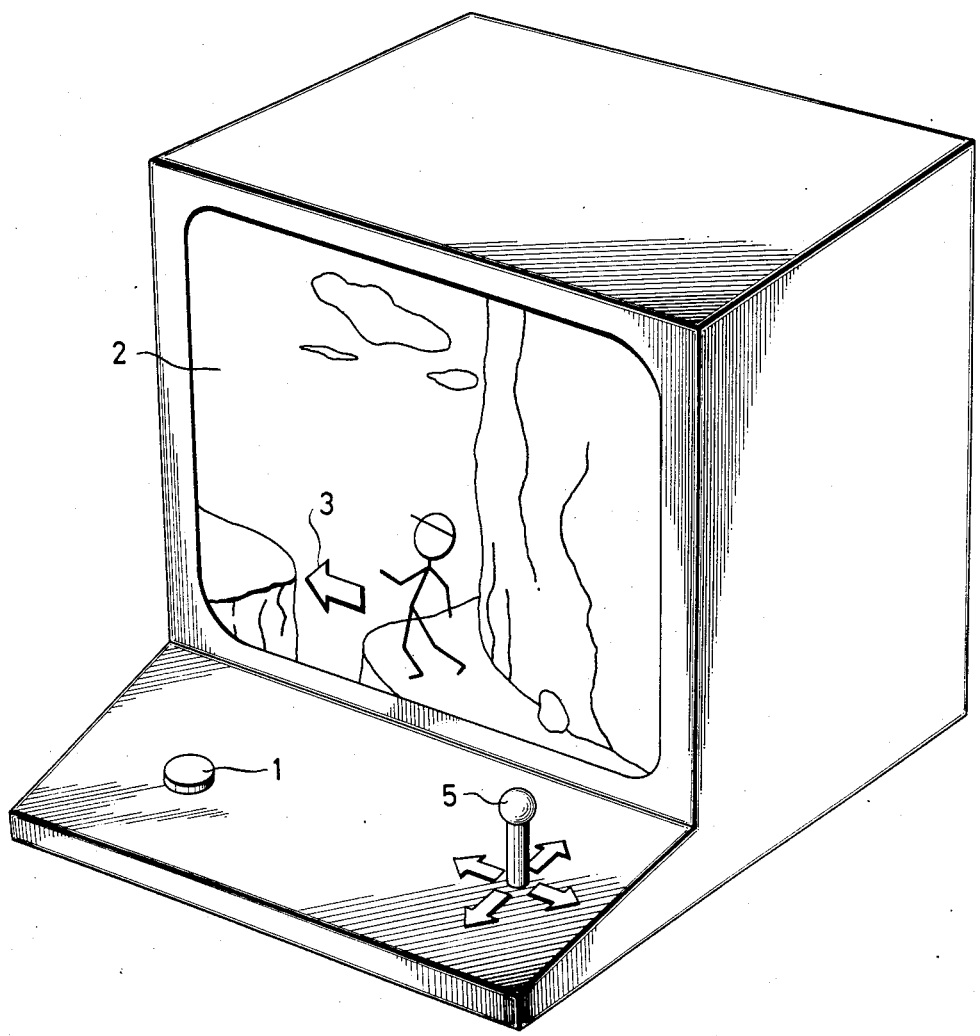
FIG. 2 is a view showing an outer appearance of the video game apparatus embodying the present invention.

Referring now to FIG. 2 which shows one example of a video game apparatus embodying the present invention, upon operation of a game start button 1, the game images are displayed on the screen 2 of a CRT. The game progress is controlled by clock pulses shown in FIG. 3 while game images are displayed. When an indicium such as an arrow 3 is displayed together with the game image as shown in FIG. 2, the player manipulates an operation lever 5 in the same direction as the arrow 3 and within a preset time limit. Only if this manipulation is performed correctly within this time limit, the game is considered a success at that stage and the next stage of the game follows. The number of manipulations of the operation lever 5 during one game is set, for example at about ten.

Figure 3:
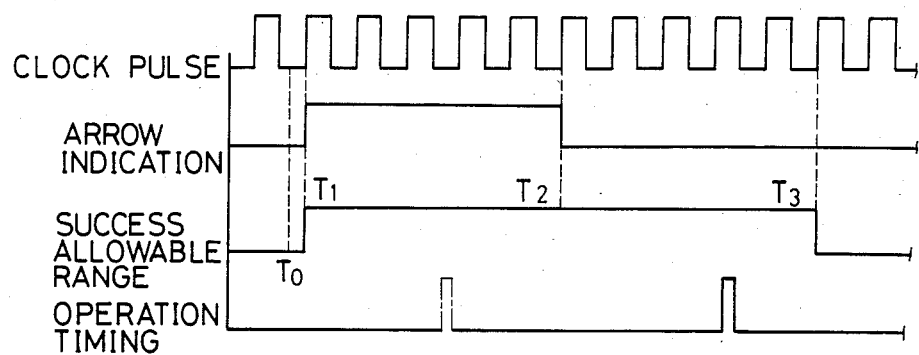
FIG. 3 is a timing chart showing the clock pulses, allowable time limit for a game success, and single operation timing.

The arrow 3 is displayed for a duration of five clock pulses counted from a game reference time T0, i.e., during the time from T1 to T2 (see FIG. 3). In order to attain a success at the stage corresponding to this scene, in addition to manipulation of the operation lever 5 in the left direction, it is necessary to manipulate it before ten clock pulses are outputted, i.e., during the time from T1 to T3. If both requirements are met, a success of the game at the scene is attained, and the next game image follows. In this way, the game progresses.

Figure 1:
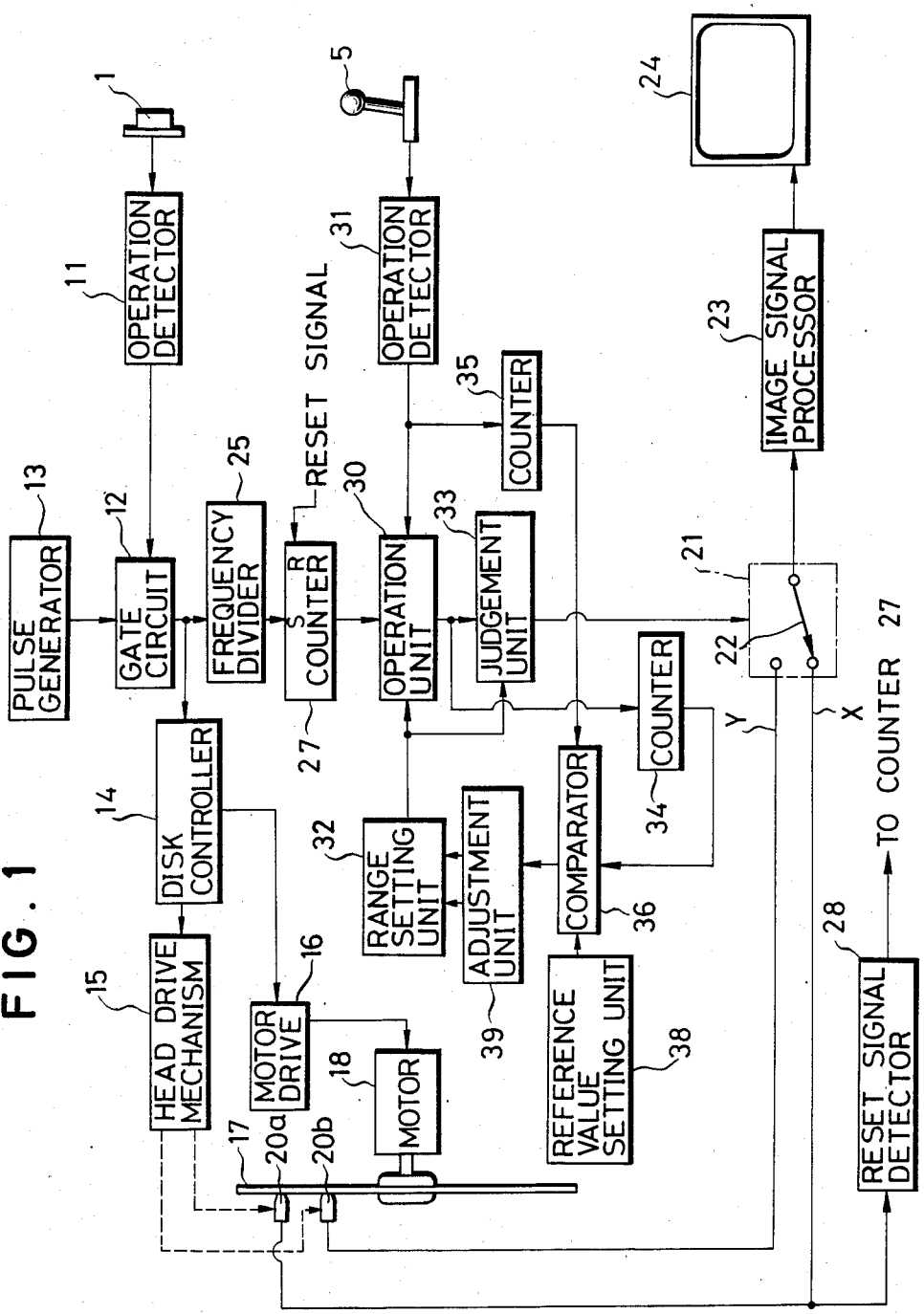
FIG. 1 is a block diagram of the circuit according to an embodiment of the invention.

Referring to FIG. 1, which shows the circuit construction for performing the above-described proceedings, upon detection by an operation detector 11 of manipulation of the start button 1, a gate circuit 12 is opened. As a result, pulses serially generated by a pulse generator 13 are supplied via a disc controller 14 to a head drive mechanism 15 and a motor drive 16. Then, a laser disk 17 storing graphic data for displaying game images is rotated by a motor 18. Read heads 20a and 20b access the laser disc 17 and read image signals recorded thereon, which are fed to terminals X and Y, respectively. The contact 22 of a switch 21 is contacted with the terminal X in an initial state so that the image signal from the read head 20a is inputted to an image signal processor 23, thereby displaying a game image on the CRT 24.

The pulses from the pulse generator 13 are also supplied to a frequency divider 25 immediately after the gate circuit 12 is opened. The frequency divider 25 demultiplies the supplied pulses to generate the clock pulses shown in FIG. 3. The number of clock pulses are counted by a counter 27. The frequency of the clock pulses counted by the counter 27 is in exact proportion with that of the pulses supplied to the disk controller 14. Therefore, the game image displayed on the CRT 24 while playing the game is always and definitely related to the count value of the clock pulses by the counter 27. The period of the clock pulses is set for example at 16.6 msec, which corresponds to a reference time for detecting the operation timings of the operation lever 5.

As the game progresses and a scene appears such that the manipulation of the operation lever 5 is required, the read head 20a heads from the laser disc 17 an image signal for displaying the game image and the arrow 3. A reset signal detector 28 connected to the signal line of the read head 20a detects the leading edge of an image signal representing the arrow 3 and outputs a reset signal to the counter 27. The count value of the counter 27 is accordingly reset to "0" and the counter resumes counting the clock pulses immediately after the arrow 3 is displayed. In particular, the counter 27 is reset to T0 shown in FIG. 3 and counts the number of clock pulses from T1. The laser disc 17 comprises a signal area for displaying the arrow 3 for a preset duration.

The player then manipulates the operation lever 5 while observing the displayed arrow 3. After the operation direction of the operation lever 5 is judged by an operation direction detector (not shown) as to whether the direction is a correct one, the operation timing at that time is judged as to whether it was within the time from T1 to T3 as shown in FIG. 3. To this end, an arithmetic operation unit 30 receives a signal generated from an operation detector 31 at the time when the operation lever is manipulated, and retrieves the count value of the counter 27. The retrieved data is subjected to arithmetic operation at the operation unit 30 in association with data set at a range setting unit 32 for setting the range of the game success time limit.

The range setting unit 32 is constructed of a RAM and stores the numbers of clock pulses "1" to "10" corresponding to the values representative of the allowable time limit for game success, that is, the time duration T1 to T3 shown in FIG. 3. The operation unit 30 outputs to a judgment unit 33 the value obtained by subtracting the middle value among the numbers of clock pulses "1" to "10", i.e., "5" from the count value of the counter 27.

The judgment unit 33 is inputted with the middle value "5" of the set range by the range setting unit 32. The judgment unit 33 judges whether the difference D obtained through the subtraction at the operation unit 30 satisfies the condition of "$-5 \leq D \leq$ "5". If the condition is met, then a low level signal (hereinafter referred to as L signal) is outputted to the switch 21. Referring particularly to FIG. 3, the operation timing corresponds to the count value "9" of the counter 27 so that the operation unit 30 outputs "4" as the difference D. As a result, the judgment unit 33 outputs an L signal to the switch 21. If the operation timing is entered at the time shown in phantom line in FIG. 3, the operation unit 30 outputs "$-2$" as the difference D.

Figure 4:
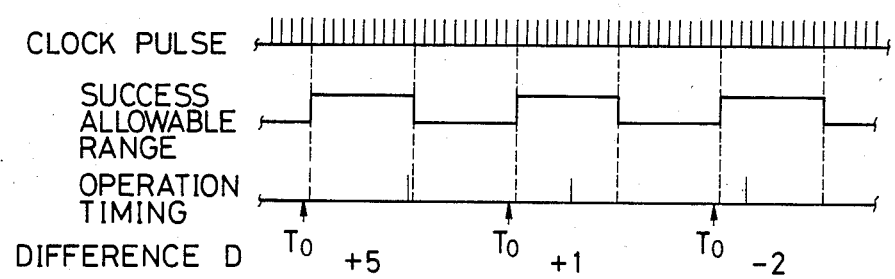
FIG. 4 is a timing chart showing the clock pulses, allowable time limits for game success, and three operation timings.

The values of the differences D from the operation unit 30 are cumulatively counted by a counter 34. Therefore, as game success is repeatedly attained, the respective differences D are accumulated at the counter 34. For instance, if the progress of the game is carried out as in FIG. 4, the counter 34 counts "+4". If the number of manipulations of the operation lever 5 reaches a predetermined value, a signal is outputted from a counter 35 to a comparator 36 which compares the count of the counter 34 with the value stored in a reference value setting unit 38. Assuming that "0" is stored in the reference value setting unit 38, an adjustment signal is supplied to an adjustment unit 39 when the count of the counter 34 is less than 37 0".

The adjustment unit 39 is constructed for example of an adder and a subtractor. Upon reception of an adjustment signal from the comparator 36, the adjustment unit 39 operates to narrow the allowable time limit for a game success by changing its upper limit set in the range setting unit 32. For example, the range of the numbers of clock pulses "1" to "10" is changed to "1" to "8". Consequently, in the ensuing game, the operation unit 30 subtracts "4" from the count of the counter 27, and the judgment unit 33 judges the difference D of the operation unit 30 based on the condition of "$-4$"$\leq D \leq$"4". Thus the degree of difficulty in playing the game is increased. When the preset number of game successes is gained, the above-mentioned operations are repeated so that the numbers of clock pulses "1" to "8" set in the range setting unit 32 at that time is changed to "1" to "6". In this case, the judgment unit 33 judges based on the condition of "$-3$"$\leq D \leq$"3".

If the operation timing of the operation lever 5 during a game does not satisfy the condition set by the range setting unit 32, a game failure is determined. In this case, the judgment unit 33 outputs a high level signal (H signal) to the switch 21. The contact 22 of the switch 21 is switched from the terminal X to the terminal Y, so that an image signal obtained from the read head 20b is supplied to the image signal processor 23. The read head 20b, in contrast to the read head 20a for reading an image signal representative of a game progress image and a game success pattern, accesses a signal area storing a game failure pattern. Therefore, switching of the contact 22 to the terminal Y enables the display of a game failure pattern on the screen of the CRT 24.

Upon occurrence of a game failure (loss), an H signal outputted from the judgment unit 33 causes the counters 34 and 35 to be reset at "0". An adjustment recovery signal is outputted to the adjustment unit 39. Then the adjustment unit 39 makes the number of clock pulses set at the range setting unit 32 return to its initial condition, i.e. "1" to "10". Thus the degree of difficulty in playing the game is lowered. The adjustment recovery signal may also be used to change the degree of difficulty by only one step, i.e., to the previously set allowable time limit for game success.

Figure 5:
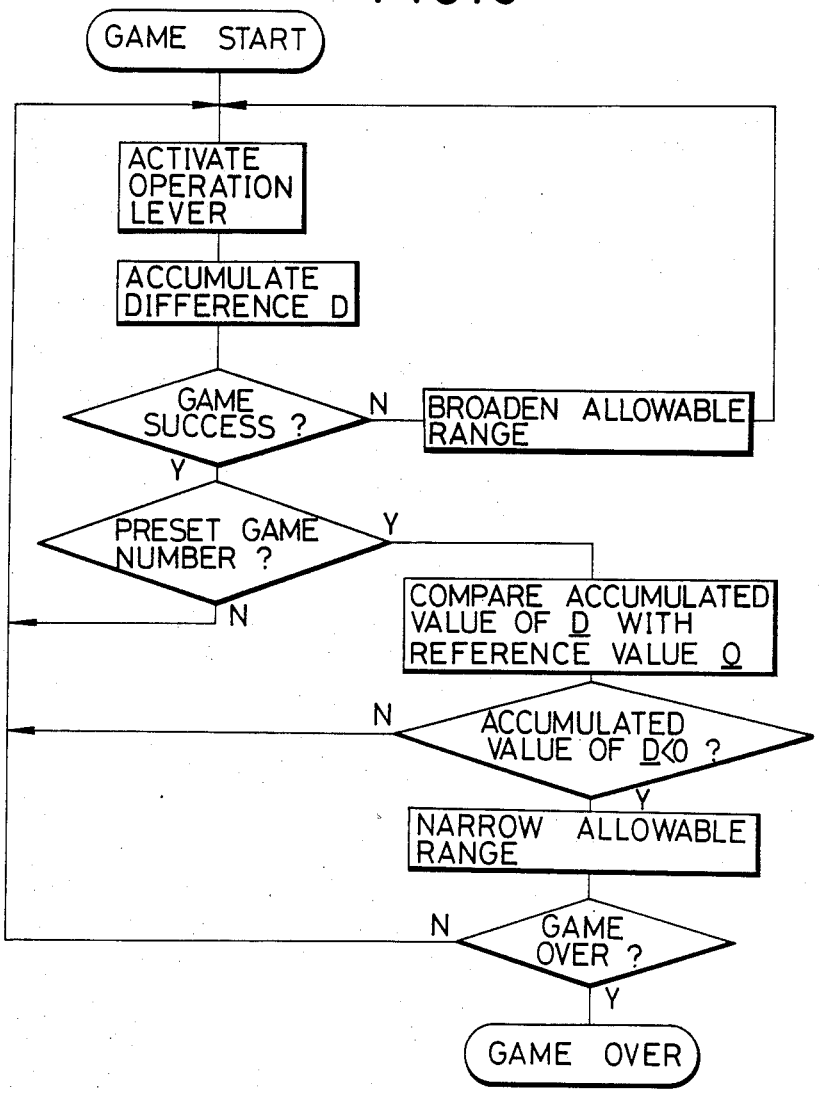
FIG. 5 is a flow chart showing the procedure for changing the allowable time limit for a game success.

The automatic control process for establishing the degree of game difficulty described above is shown in the flow chart of FIG. 5. Instead of resetting the counter 27 every time the arrow 3 is displayed, the counter 27 may be used such that the clock pulses are cumulatively counted during the game play. In this case, the allowable time limits for success, corresponding to successive manipulations of the operation lever 5 are stored beforehand in the range setting unit 32. The allowable time limit for success corresponding to each successive manipulation of the operation lever 5 is loaded to the operation unit 30 in accordance with the game number signal from the counter 35, and the corresponding suitable arithmetic operation is performed. Furthermore, a change in the degree of difficulty described above aims chiefly at making the game more difficult. However, processing to make the game easier may be employed instead. To this end, when a game failure occurs, it is checked how far wide the operation timing of the operation lever 5 falls of the allowable time limit for success. The check is carried out by counting the clock pulses which are accumulated in the counter 34, and thereafter the allowable time limit for success is widened upon actuation of the adjustment unit 39.

In the above first embodiment, the player's skill has been determined by considering the game results or scores after a predetermined number of games in such a way that the operation timings of the operation lever 5 are judged as to whether they are within the allowable time limits for game success. In a second embodiment described hereinafter, the player's skill is decided based on the scattering of the operation timings.

Figure 6:
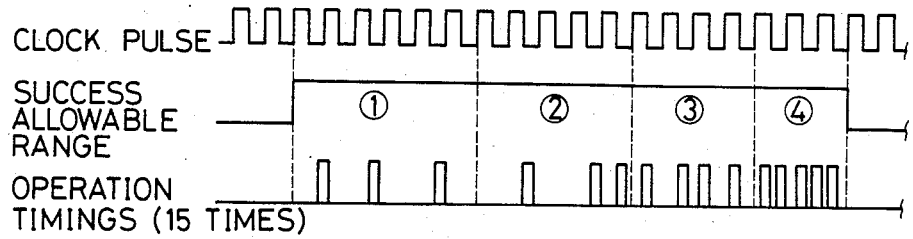
FIG. 6 is one example of a timing chart showing the clock pulses, allowable time limits for a game success and fifteen operation timings.

As shown in FIG. 6, the allowable time limits for game success are divided into four areas and the scattering of the operation timings id detected in each area. FIG. 6 shows 15 manipulations of the operation lever 5, wherein three manipulations are carried out within each of area (1) and area (2), four manipulations in area (3) and five manipulations in area (4). These operation timings are judged by an operation unit 45 (see FIG. 7) as to which area the timings fall within. The number of manipulations is counted by counters 46 and 49 provided for the respective areas. When the number of manipulations of the operation lever 5 reaches 15, a signal from the counter 35 activates a comparison and operation unit 50.

The comparison and operation unit 50 performs two arithmetic operations. In the first arithmetic operation, the maximum count detected among the counters 46 to 49, i.e., five times at area (4) is subtracted by the sum of the other areas (1), (2) and (3). In the second arithmetic operation, the sum of the maximum count and the next maximum count detected among the counters 46 to 49, i.e., the sum of the areas (4) and (3) is subtracted by the sum of the other area (1) and (2). The results of the arithmetic operations are compared with the values stored in a reference value setting unit 52. Assuming that a first reference value "0" and a second reference value "7" are preset in the reference value setting unit 52, the results of the first and second arithmetic operations are "−5" and "3", respectively. Neither of the results exceeds its corresponding reference value. In this case, the comparison and operation unit 50 does not supply any adjustment signal to an adjustment unit 39 and the allowable time limit for game success, as stored at a range setting unit 32, is not changed. Therefore, the degree of difficulty is maintained unchanged.

Figure 8:
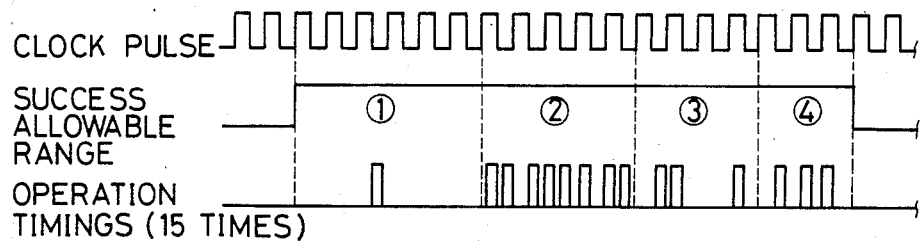
FIG. 8 is a timing chart of the second embodiment showing the clock pulses, allowable time limits for game success and fifteen operation timings.

In the example of FIG. 8, the number of manipulations are one in area (1), eight in area (2) and three in each of areas (3) and (4). In this case, the results of the first and second arithmetic operations are "1" and "7", respectively. The value of the first arithmetic operation result exceeds the first reference value, as mentioned above, so that an adjustment signal is outputted from the comparison and operation unit 50 and the adjustment unit 39 makes the allowable time limit for game success more narrow, in a similar manner to the first embodiment. The adjustment unit 39 is actuated if either the first or second arithmetic operation result exceeds its associated reference value. In FIG. 7, the elements identical with those of the first embodiment have been represented by the same reference numerals, and their detailed description has therefore not been repeated.

For purposes of determining the player's skill in accordance with the second embodiment, the player manipulating the operation lever 5 at scattered timings is assumed to be a beginner, while the player manipulating it at substantially constant timings is assumed to be a skilled player. Therefore, even those players who intentionally play at the later stage of the game are detected as skilled players. In the case of a game failure, the game success allowable time limit is made wider based upon an H signal from the judgment unit 33, similar to the first embodiment.

The present invention has been described in connection with the above embodiments, but is not intended to be limited to the video game apparatus using a laser disc. The present invention is also applicable to those apparatus using an operation button or a handle in place of the operation lever 5, those informing the player of the requirement for operation timing by a sound instead of the arrow 3, or not informing the player of the requirement for operation timing.

As seen from the foregoing description of the apparatus according to the present invention, the player's skill is judged based upon the game score, and the degree of difficulty is changed in accordance with the judgment result. Therefore, the beginning as well as the skilled player can maintain interest in playing a game incorporating this apparatus.

What is claimed is:

1. In a video game apparatus which judges a game success if a manipulation of an operation member by a player in accordance with a displayed game image (hereinafter an "operation timing") falls within an allowable time limit for a game success set in a range setting unit, the improvement comprising:
   first output means for outputting a numerical signal derived from said operation timing and said allowable time limit for game success;
   count means for counting said numerical signal from said first output means;
   second output means, responsive to said count means, for outputting an adjustment signal when the count of said count means reaches a predetermined value; and
   allowable range changing means for changing the allowable time limit for game success set in said range setting unit, said allowable range changing means being responsive to said adjustment signal.

2. A video game apparatus according to claim 1, wherein said allowable time limit for game success is divided into a plurality of areas, and said first output means output plural numerical signals based on which of said plurality of areas said operation timing falls within.

3. A video game apparatus according to claim 2, and means for performing arithmetic operations on said plural numerical signals, wherein said count means respectively counts the number of said plural numerical signals outputted from said first output means, and said second output means outputs an adjustment signal when the result of said arithmetic operations for the said plural numerical signal reaches a predetermined value.

4. A video game apparatus according to claim 1, and a clock pulse generator, wherein said allowable time limit for game success and operation timing are determined based on the number of clock pulses.

* * * * *